United States Patent [19]

Preston

[11] Patent Number: 5,076,686
[45] Date of Patent: Dec. 31, 1991

[54] AUTOMATIC FOCUSING SYSTEM FOR USE WITH A MOTION PICTURE CAMERA

[76] Inventor: Howard J. Preston, 920 Centinela Ave., Santa Monica, Calif. 90403

[21] Appl. No.: 466,223

[22] Filed: Jan. 17, 1990

[51] Int. Cl.$^5$ ............................................. G03B 13/36
[52] U.S. Cl. .................................. 352/140; 354/402; 354/403
[58] Field of Search ................ 352/140; 354/400, 401, 354/402, 195.1, 403; 356/1, 4

[56] References Cited

U.S. PATENT DOCUMENTS

| | | | |
|---|---|---|---|
| 4,032,934 | 6/1977 | Hendrickson et al. | 354/403 |
| 4,239,356 | 12/1980 | Freudenschuss et al. | 354/195.1 |
| 4,534,629 | 8/1985 | Bogle et al. | 352/140 |
| 4,601,557 | 7/1986 | Bogle et al. | 352/140 |

Primary Examiner—Russell E. Adams
Attorney, Agent, or Firm—W. Edward Johansen

[57] ABSTRACT

A motion picture camera is used with an automatic focusing system. The motion picture camera is mounted on a first tripod and includes a variable focus lens and an adjusting mechanism for adjusting the variable focus lens so that an image of a photographic subject is in focus on the focal plane. The automatic focusing system includes a housing, a range-finding subsystem, an angle-encoding subsystem, a processing subsystem and a driving assembly which is mechanically coupled to the adjusting mechanism. The housing is mounted on a second tripod and is disposed apart from the motion picture camera a first distance and from the photographic subject a second distance. The range-finding subsystem and the angle-encoding subsystem are disposed within and mechanically coupled to the housing. The range-finding subsystem determines the first distance along a first line and the second distance along a second line and provides a first signal and a second signal which are proportional to the first and second distances, respectively. The angle-encoding subsystem measures the angle by which the first and second lines diverge from each other and provides a third signal which is proportional to the angle. The processing subsystem processes the first, second and third signals to determine a third distance between the motion picture camera and the photographic subject and then generates an output signal which correlates to the third distance. The driving assembly drives the adjusting mechanism in response to the output signal.

2 Claims, 3 Drawing Sheets

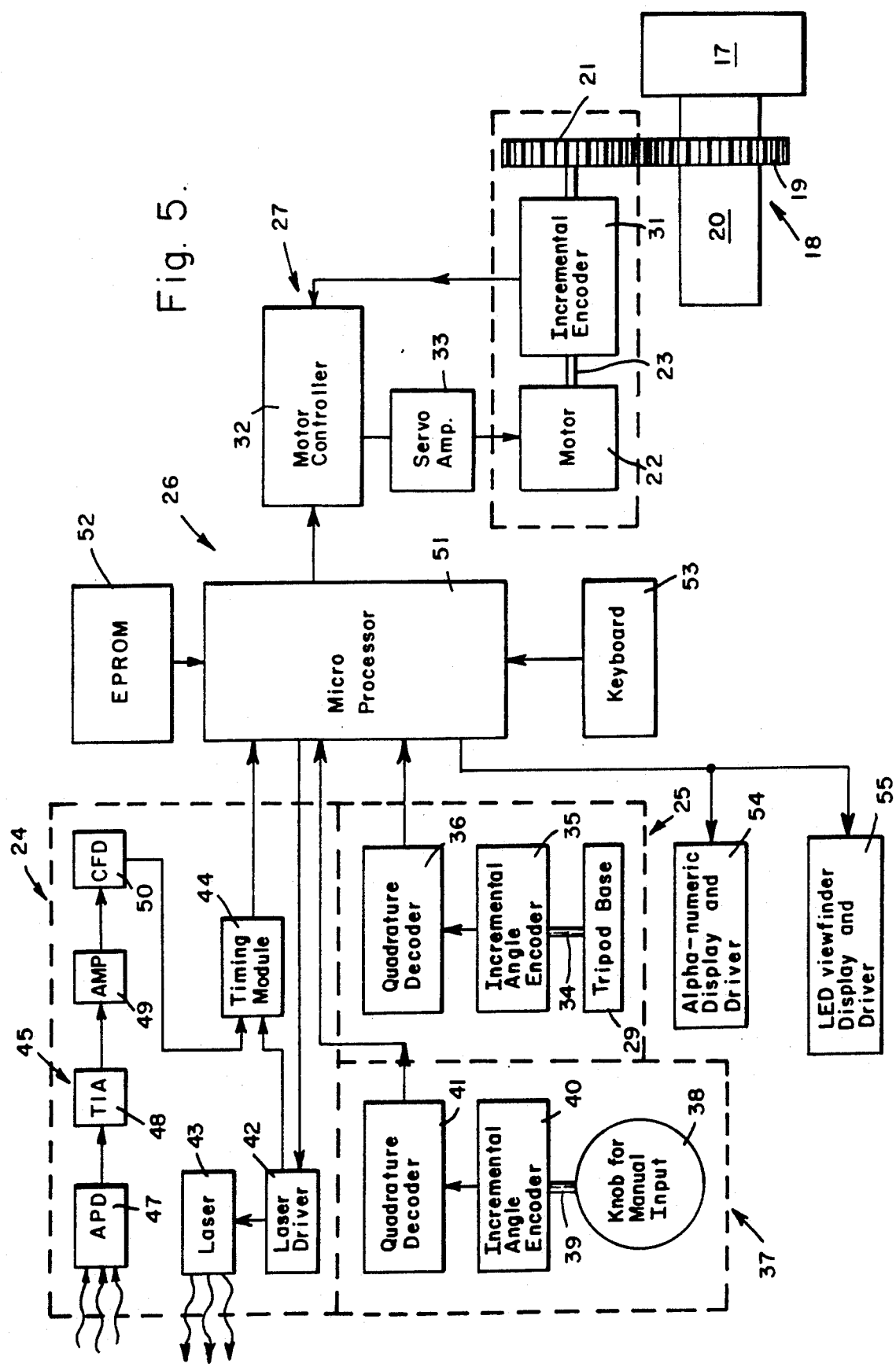

AUTOMATIC FOCUSING SYSTEM FOR USE WITH A MOTION PICTURE CAMERA

BACKGROUND OF THE INVENTION

1. Field of the Invention

The present invention relates to an automatic focusing system for a motion picture camera and more particularly to an automatic focusing system which utilizes the techniques of a laser radar and triangulation to adjust the lens for the distance between a moving or standing photographic subject and a camera focus plane in order to obtain very precise and accurate measurement of the distance so that the photographic subject is always maintained in focus.

2. Description of the Prior Art

Proper focusing of a motion picture camera is of critical importance in the commercial production of motion pictures. Sharpness of focus is an important consideration in the production of realistic commercially valuable films. Maintenance of a sharply focused image of the principal object of interest in a given scene, particularly when the principal object is in movement toward or from the camera, is a challenging matter in cinematography.

The concept of depth of field is a description of the range of distances an object of interest can be from the motion picture camera and still remain in acceptably sharp focus without adjustment of the camera lens. The depth of field becomes smaller with increasing lens focal length, with larger lens aperture and with decreasing object distance to the motion picture camera. There is a tendency in commercial camera work with a film or video camera toward a long focal length lens which is operated with a large aperture and at a close distance thereby producing a narrow limit on the depth of field. Under this narrow limit a precise and accurate adjustment of the lens focus is necessary. Previously a camera operator has depended on his skill to precisely and accurately adjust the lens focus.

U.S. Pat. No. 4,534,629, entitled Motion Picture Camera Automatic Focusing System, issued to Robert W. Bogle and Gary Gero on Aug. 13, 1985, and U.S. Pat. No. 4,601,557, entitled Motion Picture Camera Automatic Focusing System, issued to Robert W. Bogle and Gary Gero on July 22, 1986, teach an automatic focusing system for variable focus lens of a motion picture camera which includes a pulse modulator and a microwave transmitter which is mounted on a camera frame for generating a high frequency pulsed signal which is transmitted to a selected target which carries a reactive signal generator which is responsive to the first signal for coding and retransmitting the coded signal back to a receiver which is mounted on the camera frame, a signal processor for determining the interval of travel of the signal and translating the interval into a distance-analog signal that is transmitted to a focusing motor for driving the focusing mechanism of the lens for focusing the lens at the distance which is determined by the signal. The automatic focusing system is mounted on the housing of the motion picture camera.

U.S. Pat. No. 4,371,240, entitled Motion Picture Camera Having an Auto-Focus Adjusting Device, issued to Ichiro Shimizu, Yoshio Komine and Makoto Masunaga on Feb. 1, 1983, teaches an automatic focusing system for a motion picture camera which includes a servo motor with a shaft, a motor gear which is fixedly coupled to the shaft and a lens gear which is fixedly coupled to a lens barrel of a variable lens system and which engages the motor gear.

U.S. Pat. No. 4,611,244, entitled Auto-Focus System for Video Camera, issued to Kentaro Hanma and Toshio Murakami on Sept. 9, 1986, teaches an auto-focus system for a video camera having a zooming function. There is a discussion regarding the sufficiency of automatic focusing system for distances less than one meter. U.S. Pat. No. 4,191,460, entitled Camera with Automatic Focus Adjustment Device, issued to Makoto Fujiki on Mar. 4, 1980, teaches a camera having a zoom lens with a focusing range changeover device for selectively permitting photography in either one of ordinary zoom and macro-zoom modes. U.S. Pat. No. 4,719,485, entitled Automatic Follow-up Device for Camera, issued to Masao Shikaumi on July 12, 1988, teaches an automatic device for a camera which automatically captures a heat source, such as a human being, within a photographing field on the notion that a moving object to be photographed is often a human being.

U.S. Pat. No. 4,351,590, entitled Motion Picture Camera with Automatic Focusing Device, issued to Noritsugu Hirata, Masamichi Toyama, Hideto Iwama, Hidekazu Okajima and Akimasa Nishimura on Sept. 28, 1982, teaches a motion picture camera which has an automatic focusing device.

U.S. Pat. No. 4,294,531, entitled Auto-Focus Movie Camera, issued to Edwin K. Shenk on Oct. 13, 1981, teaches a motion picture camera which has a lens mount which is automatically positioned to maintain an image of a photographic subject in focus on the focal plane by generating periodic range pulses having a characteristic directly related to subject range and converting each pulse to a number which represents the focus position of the lens mount.

U.S. Pat. No. Re. 32,138, originally U.S. Pat. No. 4,082,436, entitled Motion Picture Camera, issued to Robert E. Gottschalk on May 6, 1986, teaches in a motion picture camera. U.S. Pat. No. 4,751,540, entitled Camera Tripod, issued to Mark D. Jones on June 14, 1988, teaches a tripod which is mounted on a motion picture camera. U.S. Pat. No. 3,924,828, entitled Pan, Tilt and Roll Tripod Head, issued to Victor R. Epperson on Dec. 9, 1975, teaches a pan-tilt tripod head with the added capability of rolling to either side to provide vertical or horizontal format for the motion picture camera. A single trigger controls all motion with the initial trigger squeeze releasing a clamp to allow pan and tilt motion and with a further trigger squeeze releasing a friction lock which allows the head to be rolled to either side. The trigger is mounted on a handle extended from the head for ease of control and the unit is adaptable to standard tripod and camera mounting attachments.

U.S. Pat. No. 4,268,137, entitled Radiation-Emisisve Focussing System with Integration of the Signal Produced by the System's Detector Arrangement, issued to Istvan Cocron, Theodor Huber and Wolfgang Ruf on May 19, 1981, teaches an automatic camera focusing system which has a transmitter and two detectors. The transmitter emits two pulses of radiation to a photographic subject which reflects the pulses of radiation onto the two detectors which provide a distance measuring signal to the automatic camera focusing system.

SUMMARY OF THE INVENTION

In view of the foregoing factors and conditions which are characteristic of the prior art it is the primary object of the present invention to provide an automatic focusing system for a motion picture camera which utilizes the techniques of a laser radar and triangulation to adjust the lens for the distance between a moving or standing photographic subject and a camera focus plane in order to always maintain the photographic subject in focus.

In accordance with the present invention an embodiment of an automatic focusing system for use with a motion picture camera is described. The motion picture camera is mounted on a first tripod and includes a variable focus lens and an adjusting mechanism which adjusts the variable focus lens so that an image of a photographic subject is in focus on the focal plane. The automatic focusing system includes a housing, a range-finding subsystem, an angle-encoding subsystem, a processing subsystem and a driving assembly which is mechanically coupled to the adjusting mechanism. The housing is mounted on a second tripod and is disposed apart from the motion picture camera a first distance and from the photographic subject a second distance. The range-finding subsystem and the angle-encoding subsystem are disposed within and mechanically coupled to the housing. The range-finding subsystem determines the first distance along a first line and the second distance along a second line and provides a first signal and a second signal which are proportional to the first and second distances, respectively. The angle-encoding subsystem measures the angle by which the first and second lines diverge from each other and provides a third signal which is proportional to the angle. The processing subsystem processes the first, second and third signals to determine a third distance between the motion picture camera and the photographic subject and then generates an output signal which correlates to the third distance The driving assembly drives the adjusting mechanism in response to the output signal.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 5 is an optical-schematic drawing of the range-finding and the angle-encoding subsystem of the automatic focusing system of FIG. 2.

DESCRIPTION OF THE PREFERRED EMBODIMENT

Figure 1:
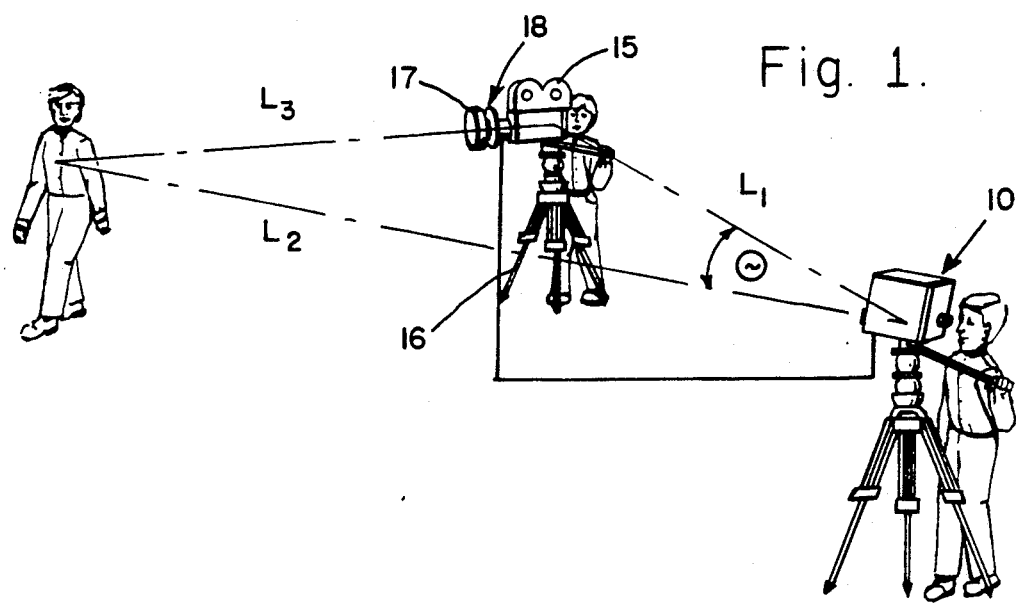
FIG. 1 is schematic drawing of an automatic focusing system for use with a motion picture camera which has been constructed in accordance with the principles of the present invention.

In order to understand the present invention it is necessary to refer to the following description of its preferred embodiment in conjunction with the accompanying drawing. Referring to FIG. 1 in conjunction with FIG. 2 and FIG. 3 an automatic focusing system 10 is for use with a motion picture camera 15 which is mounted on a first tripod 16. U.S. Pat. No. 3,924,828 teaches a tripod which may be used. The motion picture camera 15 includes a variable focus lens 17 and an adjusting mechanism 18 for adjusting the position of the variable focus lens 17 so that an image of a photographic subject is in focus on its focal plane. U.S. Pat. No. 4,294,531 teaches an adjusting mechanism 18 which includes a lens gear 19 which is fixedly coupled to a lens barrel 20 of the variable focus lens 17, a motor gear 21 which is engagingly coupled to the lens gear 19 and a servo motor 22 which has a shaft 23. The motor gear 21 is fixedly coupled to the shaft 23. U.S. Pat. No. 4,191,460 and U.S. Pat. No. 4,601,557 also teach adjusting mechanisms.

Figure 4:
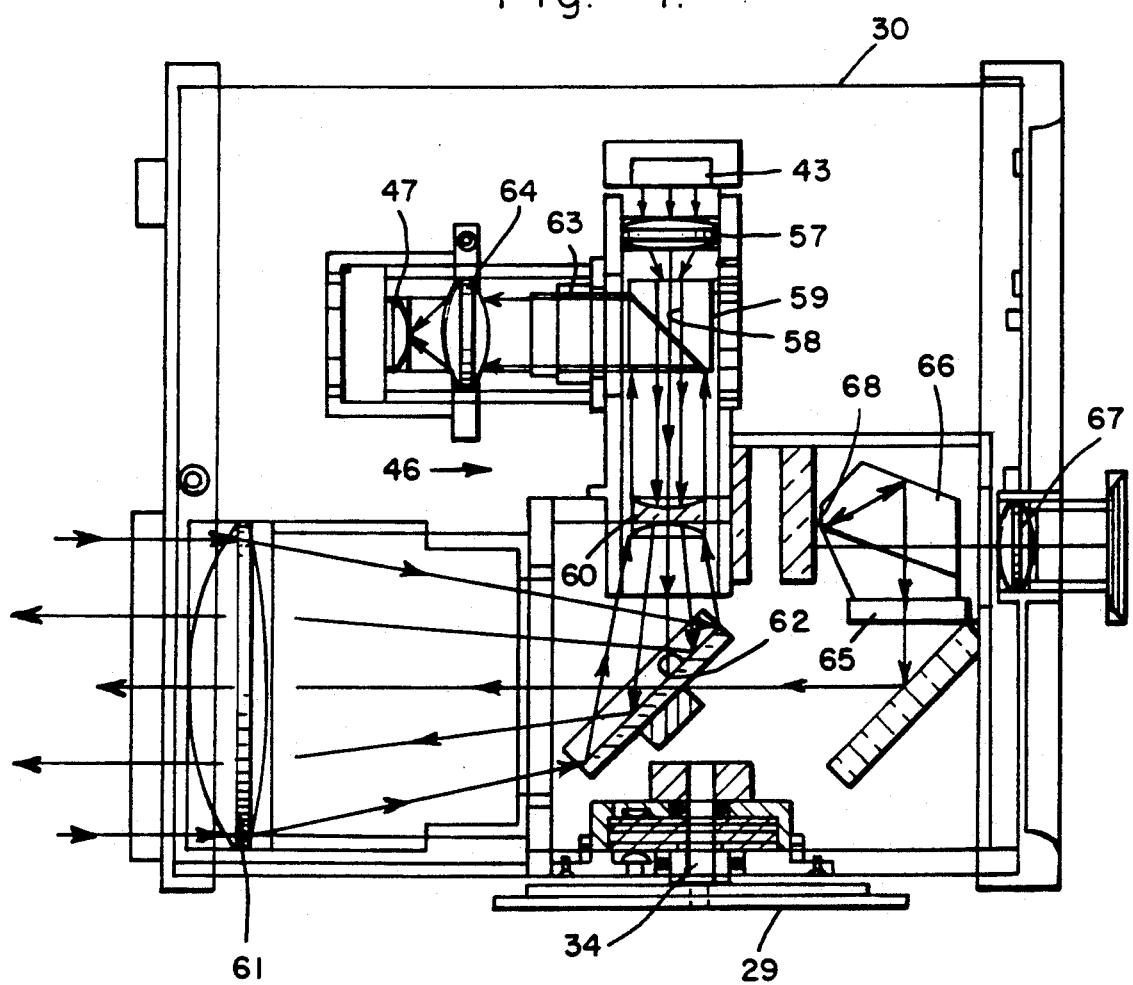
FIG. 4 is a front elevational view of the automatic focusing system of FIG. 2.
Figure 2:
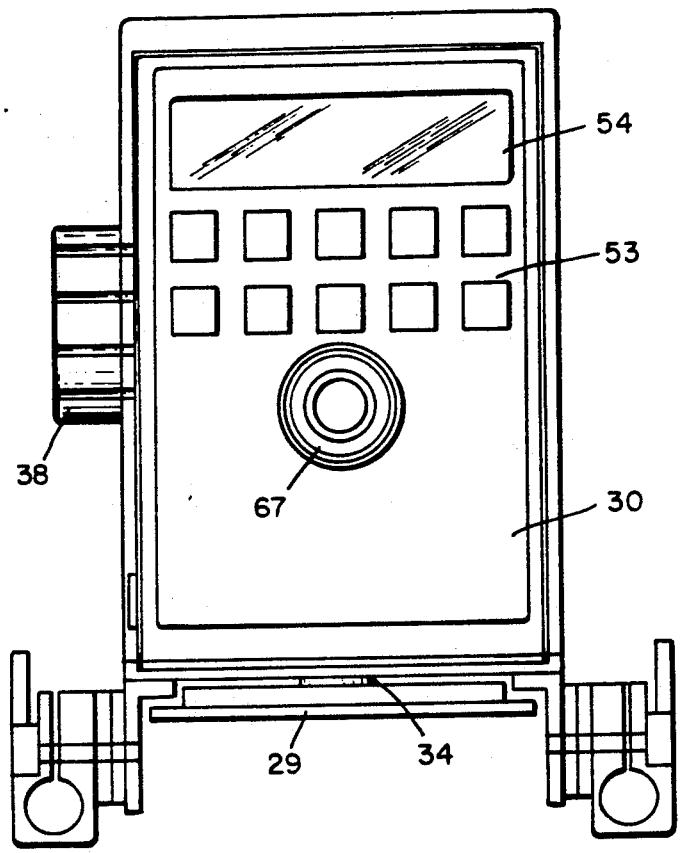
FIG. 2 is a rear elevational view of an automatic focusing system which includes a range-finding subsystem, an angle-encoding subsystem, a processing subsystem and a driving assembly and which has been constructed in accordance with the principles of the present invention.
Figure 3:
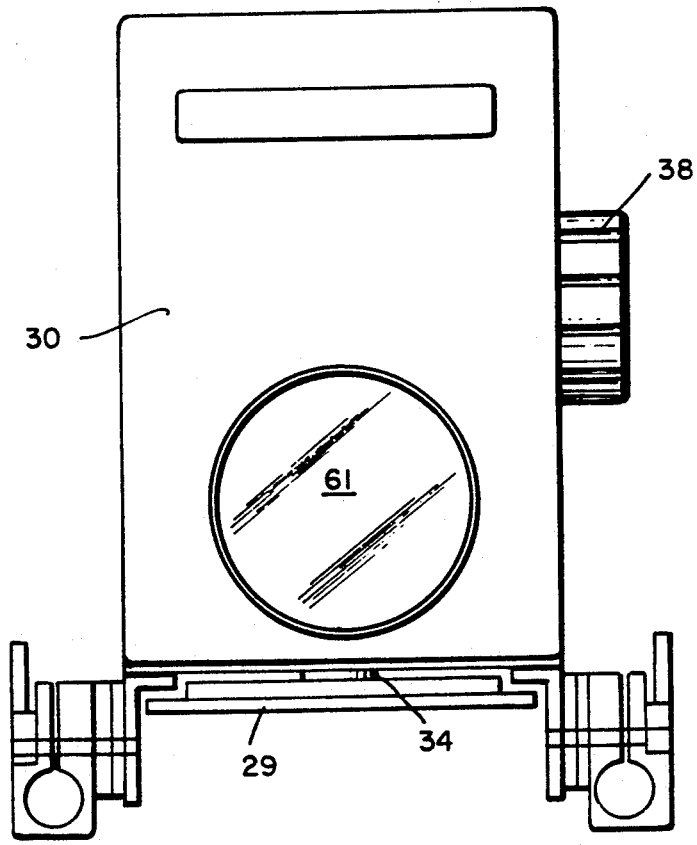
FIG. 3 is a functional schematic diagram of the range-finding subsystem, the angle-encoding subsystem, the processing subsystem and the driving assembly of the automatic focusing system of FIG. 2.

Referring to FIG. 2 in conjunction with FIG. 3 and FIG. 4 the automatic focusing system 10 includes a laser range-finding subsystem 24, an angle-encoding subsystem 25, a processing subsystem 26 and a driving assembly 27. A second tripod 28 has a mounting plate 29. The automatic focusing system 10 includes a housing 30 which is mounted on the mounting plate 29. The automatic focusing system 10 is disposed apart from the motion picture camera 15 a first distance, $L_1$, and from the photographic subject a second distance, $L_2$. The laser range-finding subsystem 24 and the angle-encoding subsystem 25 are disposed within and mechanically coupled to the housing 30. The laser range-finding subsystem 24 determines the first distance, $L_1$, along a first line and the second distance, $L_2$, along a second line and provides a first signal and a second signal which are proportional to the first and second distances, $L_1$ and $L_2$, respectively. The angle encoding subsystem 25

2 measures the angle, $\theta$, by which the first and second lines diverge from each other and provides a third signal which is 4 proportional to the angle, $\theta$. The processing subsystem 26 processes the first, second and third signals to determine a third distance, $L_3$, between the motion picture camera 15 and the photographic subject and then generates an output signal which correlates to the third distance, $L_3$.

Referring to FIG. 2 in conjunction with FIG. 3 the adjusting mechanism 18 also includes an incremental encoder 31 which is mechanically coupled to the shaft 23. The driving assembly 27 includes a motor controller 32 and a servo amplifier 33 which is electrically coupled to the servo motor 22 in order to drive the servo motor 22 in response to the output signal. The incremental encoder 31 is electrically coupled to the motor controller 32. The incremental encoder 31 measures the angular position of the shaft 23 and generates a feed-back signal which provides the exact angular position of the shaft 22. The feed-back signal is sent to the motor controller 32.

Referring to FIG. 2 in conjunction with FIG. 3 and FIG. 5 the angle-encoding subsystem 25 includes a first shaft 34, a first incremental angle encoder 35 and a first quadrature decoder 36 which provides an angle input signal. The first shaft 34 is fixedly coupled to the mounting plate 29 and rotatively coupled to the housing 30 through the first incremental angle encoder 35. U.S. Pat. No. 4,587,513, entitled Noncontact Shaft Angle Detector, issued to David E. Burrowes, Alan W. Holmes and Daniel R. Valentine on May 6, 1986, teaches an apparatus which utilizes a patterned disc which is secured to the shaft in order to non-contactly determine the shaft angle. The disc has sectors of different optical properties so that radiant energy directed to the disc is encoded by the sectored pattern. U.S. Pat. No. 4,129,862, entitled Apparatus for Digitally Encoding the Angular Position of a Shaft with Respect to a Reference Bearing, issued to Irving I. Kaplan and Daniel J. Lincoln on Dec. 12, 1978, teaches a high resolution digital angle encoder for determining the angle of a shaft with respect to a reference position. U.S. Pat. No. 4,709,146, entitled Optically Coupled Shaft Angle Encoder, issued to Harold J. Reitsema On Nov. 24, 1987, teaches an optically coupled shaft angle encoder for measuring relative rotational angle of a shaft. The automatic focusing system 10 also includes a manual input subsystem 37 which includes a knob 38, a second shaft 39, a second incremental angle encoder 40 and a second quadrature decoder 41 which provides a manual input signal. The second shaft 38 is fixedly coupled to the knob 38 and rotatively coupled to the housing 30 through the second incremental angle encoder 35. The automatic focusing system 10 is secured to the mounting plate 29 of the second tripod 28 through the incremental angle encoder 35. The quadrature decoder 36 determines the direction and the angle between the automatic focusing system 10 to motion picture camera 15 line and the automatic focusing system 10 to photographic subject line.

Referring to FIG. 3 in conjunction with FIG. 5 the laser range-finding subsystem 24 includes a laser driver 42, a diode laser 43, a timing module 44, an optical receiver 45 and an optical system 46. The optical receiver 45 includes an avalanche photo diode detector 47, a transimpedance amplifier 48, an amplifier 49 and a constant fraction discriminator 50. The transimpedance amplifier 48 is electrically coupled to the avalanche photo diode detector 47. The amplifier 49 is electrically coupled to the transimpedance amplifier 48. The constant fraction discriminator 50 is electrically coupled to the amplifier 49. The diode laser 43 generates and directs a plurality of pulses of light energy at either the motion picture camera 15 or the photographic subject so that the pulses of light energy are reflected back thereby. The light pulse emitted from the diode laser 43 is directed by the optical system 46 to fall onto the photographic subject. The light which is reflected by the photographic subject is gathered by the optical system 46 and caused to focus onto the avalanche photo diode detector 47. The avalanche photo diode 47 has a sensitivity which closely matches the emission wavelength of the diode laser 43 and a gain relative to a PIN diode which is on the order of 500 or more. The current pulse generated within the avalanche photo diode 47 in response to the received laser pulse is first amplified by the transimpedance amplifier 48 which has a bandwidth greater than 1 GHz and is further amplified by the amplifier 49 which has a wide bandwidth by approximately 30 db. The pulse from the amplifier 49 is converted to a logic level signal by the constant fraction discriminator 50. The leading edge of the logic level output of the constant fraction discriminator 50. The leading edge of the logic level output rises at a time which is independent of the amplitude of the received light pulse over a large range of received amplitudes. The output pulse from the constant fraction discriminator 50 is used to halt the time measurement process implemented by the timing module 44. The optical receiver 45 receives the reflected pulses of light energy from either the motion picture camera 15 or the photographic subject. The timing module 44 measures the elapsed time of the roundtrip of the pulses of light energy. The processing subsystem 26 determines either the first distance, $L_1$, or the second distance, $L_2$, from the elapsed time. U.S. Pat. No. 4,586,806, issued to Seiichi Isogichi and Hiroshi Takahashi on May 6, 1986, teaches an active type camera range-finder which includes a light-emitting diode, a plurality of photo-transistors, an amplifier and an operable circuit. The light-emitting diode emits light energy to an object. The photo-transistors generate electric signals corresponding to the light energy which is reflected from the object. The amplifier provides automatic gain control. The operable circuit generates a distance signal between the camera and the object from the electric signals. U.S. Pat. No. 4,561,775, Thermally Integrated Laser/FLIR Rangefinder, issued to Thomas R. Patrick, Richard Powell and Barry N. Berdanier on Dec. 31, 1985, teaches a laser range-finder which includes a laser transmitter, a receiver and a counting circuit. The laser transmitter directs light energy toward a target. The receiver detects the return light energy which is the light energy which is reflected from the target. The counting circuit counts the time between the firing of the laser transmitter and detection of the return light energy. U.S. Pat. No. 4,613,231, entitled Laser Range Finder with Non-Linearity Compensation, issued to Guenter Wichmann on Sept. 23, 1986, also teaches a range finder which includes a laser transmitter, a receiver and a counting circuit. U.S. Pat. No. 4,690,550, entitled Laser Range Finder, issued to Christopher Kuhne on Sept. 1, 1987, teaches a laser range finder which has a telescope used for both transmitting and receiving. U.S. Pat. No. 4,787,291, entitled Gun Fire Control System, issued to Millard Frohock on Nov. 29, 1988, teaches a laser range finder for use in a gun fire control system.

Referring to FIG. 5 in conjunction with FIG. 3 the processing device 24 includes a micro-processor 51, an electronically programmable read only memory (EPROM) 52, a keyboard 53, an alpha-numeric display and driver 54, a light emitting diode (LED) viewfinder display and driver 55 and a viewing optical system 56. The micro-processor 51 has at least five input terminals and three output terminals. The timing module 44 is electrically coupled to a first of the five input terminals. The keyboard 53 is electrically coupled to a second of the five input terminals. The first quadrature decoder 36 is electrically coupled to a third of the five input terminals. The second quadrature decoder 41 is electrically coupled to a fourth of the five input terminals. The electronically programmable read only memory 52 is electrically coupled to a fifth of the five input terminals in order to provide a software program for calculating the equation: $L^2{}_3 = L^2{}_1 + L^2{}_2 - 2L_1L_2 \cos \theta$. In the calibration procedure the operator uses the automatic focusing system 10 to measure the distance between the focal plane of the motion picture camera 15 and itself as well as to establish a reference line for measuring the angle, $\theta$, between the automatic focusing system 10 and the motion picture camera 15. The adjusting mechanism 18 is able to adjust the position of the variable focus lens 17 so that an image of a photographic subject is in focus on the focal plane of the motion picture camera 15. The variable focus lens 17 is characterized by its effective focal length and a scaling factor which relates how many degrees the lens gear 19 on the adjusting mechanism 18 must be rotated for any given distance between the movie picture camera 15 and the photographic subject. When an operator confirms that the variable focus lens 17 is in proper focus at the focal plane of the motion picture camera 15 at each of the specified distances he presses a key on the keyboard 53 to enter the data. The operator the automatic focusing system 10 is prompted by the alpha-numeric display and driver 54 to focus the variable focus lens 17 at three points: the first point at infinity, the second point at a middle distance and a third point at the closest possible distance. The operator rotates the knob 38 to manually control the position of the variable focus lens 17. Rotation of the knob 38 causes the second quadrature decoder 41 to send electronic pulses to the microprocessor 51 which causes the motor controller 32 and the servo amplifier 33 to drive the servo motor 22 thereby rotating the lens barrel 19 of the variable focus lens 17. When the operator confirms that the variable focus lens 17 is in proper focus at the focal plane of the motion picture camera 15 at each of the specified distances he presses a key on the keyboard 53 to enter the data. The microprocessor 51 uses the equation, $1/f = 1/O + 1/I$, for the relationship between focal length, f, image distance, I, and object distance, O, to calculate the effective focus length of the variable focus lens 17. Furthermore, since the variable focus lens 17 is customarily implemented using a threaded screw mechanism, the image distance can be expressed in terms of angular rotation, $\Phi$, of the lens barrel 19, a first constant, k, and a second constant, f by the equation, $I = k \times \Phi + f$. The software routines written in the electronically programmable read only memory (EPROM) 52 are used to determine the constants, k and f, from lens calibration data.

The automatic focusing system 10 can now be used to implement an autofocus function. When the operator presses the "focus lock" key on the keyboard 53 or an auxiliary switch which located on the pan arm of the second tripod 29, the microprocessor 51 sends a trigger pulse to the timing module 44 which converts the TTL level logic pulse to a high current pulse of approximately 15 amperes which causes the diode laser 43 to emit a short light pulse. Part of the high current driving pulse is sent to the "start" input of the timing module 44. The digital value of the time measurement is sent to the microprocessor 51 which divides the measured time interval presented by the timing module 44 by the value of the speed of light in air to determine the distance between the automatic focusing system 10 and the photographic subject.

The microprocessor 51 uses both the effective focal length of the variable focus lens 17 and an angular scaling factor both measured during the calibration sequence to calculate the proper angle of rotation for the lens barrel 19. The angular position information is sent to the motor controller 32 through one of the input terminals of the microprocessor 51. The motor controller 32 compares the actual position of the lens gear 19 as measured by the incremental encoder 31 to the angular position sent to the motor controller 32 from the microprocessor 51.

The motor controller 51 sends an error signal to the servo amplifier 33 which drives the servo motor 22. The shaft 23 turns the motor gear 21 and the lens gear 19 on the lens barrel 20 so that the lens gear 19 is at the position specified by the microprocessor 51.

In addition to the fully automatic autofocus function as described above, several modes using both the laser ranging data as well as manual data input has been implemented in this design.

By choosing the manual offset mode from keyboard 53 the operator can cause the lens to focus at a point either closer or farther than the photographic subject by using the knob 38. In this mode of operation the amount of offset introduced manually is shown in the alpha-numeric display and driver 54 and the light emitting (LED) viewfinder display and driver 55 indicating to the operator where the variable focus lens 17 is focused relative to the photographic subject.

By choosing the focus split mode from the keyboard 53 the operator can manually control the rate at which the variable focus lens 17 changes focus from one photographic subject to a second photographic subject. In this mode the operator uses the "focus lock" button to cause the variable focus lens 17 to focus to a first photographic subject. He then releases the "focus lock" button and centers the crosshair in the light emitting diode (LED) viewfinder display and driver 55 on a second photographic subject. The alpha-numeric display and driver 54 and the light emitting diode (LED) viewfinder display and driver 55 indicate the distance between the first and second photographic subjects. The servo motor 22 will remain on the first photographic subject until the knob 38 is rotated to bring focus onto the second photographic subject. As the focus is shifted between the two photographic subjects, the light emitting diode (LED) viewfinder display and driver 55 indicates the offset between the variable focus lens 17 and the second photographic subject. When the light emitting diode (LED) viewfinder display and driver 55 indicates zero the lens will be focused on the second photographic subject.

In order to prevent the variable lens 17 from being focused to infinity when the operator misses the photographic subject or focused to an obstructing object which is interposed between the photographic subject and the automatic focusing system 10. The microprocessor 51 can be given a near focus limit and a far focus limit through the knob 38. Objects which are measured to be outside range specified by these focus limits will be ignored, and the focus will remain unchanged until a valid measurement within the desired range is made.

Referring to FIG. 5 the diode laser 43, the optical receiver 45 and the viewing optical system 56 are all aligned along the same line of sight. The diode laser 43 generates and directs a laser light pulse which is collimated by a laser collimating lens 57 and which passes through a central elliptical hole 58 in a beam-splitter 59. A negative lens 60 and an objective lens 61 form a beam expander. An infrared mirror 62 reflects the laser light pulse which has been diverged after passing through the negative lens 60. The objective lens 61 recollimates the laser light pulse. The objective lens 61 converges the laser light which has been reflected from the photographic subject. The infrared laser component of this light is reflected by the infrared mirror 62 through the negative lens 60 which recollimates this light. The beam-splitter 59 reflects the infrared light through a narrow band interference filter 63 which reduces the amount of ambient light which tends to obscure the weak reflection signals. A detector lens 64 focuses the collimated light onto the avalanche photo diode detector 47 of the optical receiver 45. Visible light is converged by the objective lens 61 and passes through the infrared mirror 62 and is imaged onto a ground glass/crosshair/field optical lens 65. A roof penta-prism 66 reverts the image which is viewed through an eye-lens 67. One side of the penta-prism 66 has an unsilvered window 6 which allows the light emitting diode (LED) viewfinder display 55 to be viewed through the penta-prism 66 and the negative lens 60.

From the foregoing it can be seen that an automatic focusing system for use with a motion picture camera has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An automatic focusing system for use with a motion picture camera which is mounted on a first tripod and which includes a variable focus lens and an adjusting mechanism for adjusting the variable focus lens so that an image of a photographic subject is in focus on a focal plane, said automatic focusing system comprising:
   a. a housing which is mounted on a second tripod which is disposed apart from the motion picture camera a first distance and from the photographic subject a second distance;
   b. range-finding means for determining said first distance along a first line and said second distance along a second line and for providing a first signal and a second signal which are proportional to said first and second distances, respectively, said range-finding means being mechanically coupled to said housing;
   c. angle-measuring means for measuring said angle by which said first and second lines diverge from each other and for providing a third signal which is proportional to said angle, said angle-measuring means being mechanically coupled to said housing;
   d. processing means for processing said first, second and third signals to determine a third distance between the motion picture camera and the photographic subject and generating an output signal which correlates to said third distance; and
   e. driving means for driving the adjusting mechanism in response to said output signal.

2. An automatic focusing system according to claim 1 wherein said range-finding means is a laser range finder which comprises:
   a. a laser which generates and directs a plurality of pulses of light energy at a target so that the pulses of light energy are reflected by the target;
   b. an optical receiver which receives the reflected pulses of light energy from the target;
   c. time-measuring means for measuring the elapsed time of a roundtrip of the pulses of light energy; and
   d. processing means for determining the distance between the target and said range finder.

* * * * *